United States Patent
Kalinli-Akbacak (10) Patent No.: US 10,049,657 B2
(45) Date of Patent: *Aug. 14, 2018

(54) USING MACHINE LEARNING TO CLASSIFY PHONE POSTERIOR CONTEXT INFORMATION AND ESTIMATING BOUNDARIES IN SPEECH FROM COMBINED BOUNDARY POSTERIORS

(71) Applicant: Sony Interactive Entertainment Inc., Tokyo (JP)

(72) Inventor: Ozlem Kalinli-Akbacak, Burlingame, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 15/606,948

(22) Filed: May 26, 2017

(65) Prior Publication Data

US 2017/0263240 A1 Sep. 14, 2017

Related U.S. Application Data (63) Continuation of application No. 13/901,426, filed on May 23, 2013, now Pat. No. 9,672,811.

(Continued)

(51) Int. Cl.
*G10L 15/04* (2013.01)
*G10L 25/03* (2013.01)
(Continued)

(52) U.S. Cl.
CPC ............. *G10L 15/04* (2013.01); *G10L 25/03* (2013.01); *G10L 15/16* (2013.01); *G10L 25/30* (2013.01)

(58) Field of Classification Search
CPC .................... G10L 15/04; G10L 25/30
See application file for complete search history.

(56) References Cited

U.S. PATENT DOCUMENTS

| | | | | |
|---|---|---|---|---|
| 4,032,710 A | * | 6/1977 | Martin | G10L 15/00 704/253 |
| 4,394,538 A | * | 7/1983 | Warren | G10L 15/063 704/251 |

(Continued)

FOREIGN PATENT DOCUMENTS

| | | | | |
|---|---|---|---|---|
| CN | 101315733 B | | 6/2010 | |
| EP | 1596363 A1 | * | 11/2005 | G10L 13/06 |

(Continued)

OTHER PUBLICATIONS

Kalinli et al, "Prominence Detection Using Auditory Attention Cues and Task-Dependent High Level Information," IEEE Transactions on Audio, Speech and Language Processing, vol. 17, No. 5, Jul. 2009.*

(Continued)

*Primary Examiner* — Daniel C Washburn
*Assistant Examiner* — Oluwadamilola M Ogunbiyi
(74) *Attorney, Agent, or Firm* — JDI Patent; Joshua Isenberg; Robert Pullman (57) ABSTRACT

Phoneme boundaries may be determined from a signal corresponding to recorded audio by extracting auditory attention features from the signal and extracting phoneme posteriors from the signal. The auditory attention features and phoneme posteriors may then be combined to detect boundaries in the signal.

21 Claims, 5 Drawing Sheets

Related U.S. Application Data (60) Provisional application No. 61/731,403, filed on Nov. 29, 2012.

(51) Int. Cl.
  *G10L 15/16* (2006.01)
  *G10L 25/30* (2013.01)

(56) References Cited

U.S. PATENT DOCUMENTS

| | | | |
|---|---|---|---|
| 4,594,575 A | 6/1986 | Avery et al. | |
| 4,696,041 A | 9/1987 | Sakata | |
| 4,975,960 A | 12/1990 | Petajan | |
| 4,979,212 A | 12/1990 | Yamada et al. | |
| 5,586,215 A | 12/1996 | Stork et al. | |
| 5,638,487 A * | 6/1997 | Chigier | G10L 15/04 704/202 |
| 5,806,036 A | 9/1998 | Stork | |
| 5,852,669 A | 12/1998 | Eleftheriadis et al. | |
| 5,897,616 A | 4/1999 | Kanevsky et al. | |
| 5,940,794 A * | 8/1999 | Abe | G10L 15/04 704/240 |
| 6,161,090 A | 12/2000 | Kanevsky et al. | |
| 6,185,529 B1 | 2/2001 | Chen et al. | |
| 6,243,683 B1 | 6/2001 | Peters | |
| 6,529,871 B1 | 3/2003 | Kanevsky et al. | |
| 7,117,157 B1 | 10/2006 | Taylor | |
| 7,165,029 B2 | 1/2007 | Netian | |
| 7,209,883 B2 | 4/2007 | Netian | |
| 7,454,342 B2 | 11/2008 | Netian Ara et al. | |
| 7,472,063 B2 | 12/2008 | Netian et al. | |
| 7,742,914 B2 | 6/2010 | Kosek et al. | |
| 7,783,061 B2 | 8/2010 | Zalewski et al. | |
| 7,809,145 B2 | 10/2010 | Mao | |
| 7,962,341 B2 | 6/2011 | Braunschweiler | |
| 8,209,182 B2 | 6/2012 | Narayanan | |
| 8,463,719 B2 | 6/2013 | Lyon et al. | |
| 8,589,151 B2 | 11/2013 | Chamberlain | |
| 8,600,749 B2 | 12/2013 | Ljolje | |
| 8,655,656 B2 * | 2/2014 | Ketabdar | G10L 25/48 704/226 |
| 8,676,574 B2 | 3/2014 | Kalinli | |
| 8,756,061 B2 | 6/2014 | Kalinli et al. | |
| 9,020,822 B2 | 4/2015 | Kalinli-Akbacak | |
| 9,031,293 B2 | 5/2015 | Kalinli-Akbacak | |
| 9,672,811 B2 | 6/2017 | Kalinli-Akbacak | |
| 2001/0051871 A1 | 12/2001 | Kroeker | |
| 2002/0128827 A1 | 9/2002 | Bu et al. | |
| 2002/0135618 A1 | 9/2002 | Maes et al. | |
| 2003/0018475 A1 | 1/2003 | Basu et al. | |
| 2004/0231498 A1 | 11/2004 | Li et al. | |
| 2006/0020461 A1 * | 1/2006 | Ogawa | G10L 15/04 704/251 |
| 2006/0020473 A1 | 1/2006 | Hiroe et al. | |
| 2006/0025989 A1 | 2/2006 | Mesgarani et al. | |
| 2006/0239471 A1 | 10/2006 | Mao et al. | |
| 2006/0247919 A1 * | 11/2006 | Specht | G10L 21/06 704/201 |
| 2007/0016426 A1 | 1/2007 | Hershey | |
| 2008/0133228 A1 | 6/2008 | Rao | |
| 2008/0189109 A1 * | 8/2008 | Shi | G10L 15/04 704/240 |
| 2008/0201134 A1 | 8/2008 | Iwakura et al. | |
| 2008/0201140 A1 | 8/2008 | Wells et al. | |
| 2008/0235582 A1 | 9/2008 | Zalewski et al. | |
| 2008/0249773 A1 | 10/2008 | Bejar et al. | |
| 2008/0262839 A1 | 10/2008 | Nonaka et al. | |
| 2009/0076817 A1 * | 3/2009 | Jeon | G10L 15/187 704/240 |
| 2009/0173216 A1 | 7/2009 | Gatzsche et al. | |
| 2009/0210220 A1 | 8/2009 | Mitsuyoshi et al. | |
| 2009/0265166 A1 | 10/2009 | Abe | |
| 2009/0313019 A1 | 12/2009 | Kato et al. | |
| 2010/0121638 A1 | 5/2010 | Pinson et al. | |
| 2010/0145695 A1 | 6/2010 | Jung et al. | |
| 2010/0174533 A1 * | 7/2010 | Pakhomov | G10L 17/26 704/205 |
| 2010/0280827 A1 | 11/2010 | Mukerjee et al. | |
| 2011/0004341 A1 | 1/2011 | Sarvadevabhatla et al. | |
| 2011/0009193 A1 | 1/2011 | Bond et al. | |
| 2011/0029314 A1 | 2/2011 | Lin et al. | |
| 2011/0075855 A1 | 3/2011 | Oh et al. | |
| 2011/0099009 A1 | 4/2011 | Zopf et al. | |
| 2011/0123965 A1 * | 5/2011 | Yu | G09B 19/04 434/156 |
| 2011/0141258 A1 | 6/2011 | Song et al. | |
| 2011/0144986 A1 | 6/2011 | Yu et al. | |
| 2012/0116756 A1 | 5/2012 | Kalinli | |
| 2012/0197153 A1 | 8/2012 | Kraus et al. | |
| 2012/0253812 A1 | 10/2012 | Kalinli et al. | |
| 2013/0144616 A1 | 6/2013 | Bangalore | |
| 2013/0262096 A1 | 10/2013 | Wilhelms-Tricarico et al. | |
| 2013/0304478 A1 | 11/2013 | Sun et al. | |
| 2014/0112556 A1 | 4/2014 | Kalinli-Akbacak | |
| 2014/0114655 A1 | 4/2014 | Kalinli-Akbacak | |
| 2014/0149112 A1 | 5/2014 | Kalinli-Akbacak | |
| 2014/0149116 A1 * | 5/2014 | Mitsui | G10L 15/08 704/240 |

FOREIGN PATENT DOCUMENTS

| | | |
|---|---|---|
| JP | 02205897 | 8/1990 |
| JP | 0403615 A2 | 6/1991 |
| JP | 05257496 | 10/1993 |
| JP | 2006031033 A | 2/2006 |
| RU | 2403626 C2 | 11/2010 |
| WO | 2012134541 A | 10/2012 |

OTHER PUBLICATIONS

Kalinli et al, "A Top-Down Auditory Attention Model for Learning Task Dependent Influencies on Prominence Detection in Speech," IEEE International Conference on Acoustics, Speech and Signal Processing, 2008.*

Liu, Yang, et al, "Comparing and Combining Generative and Posterior Probability Models: Some Advances in Sentence Boundary Detection in Speech," SRI International Menlo Park United States, 2004.*

Liu, Yang, et al, "Using Machine Learning to Cope With Imbalanced Classes in Natural Speech: Evidence From Sentence Boundary and Disfluency Detection," Eighth International Conference on Spoken Language Processing, 2004.*

Yoshio Matsumoto et al, "An Algorithm for Real-time Stereo Vision Implementation of Head Pose and Gaze Direction Measurement", IEEE International Conference on Automatic Face and Gesture Recognition—FGR, pp. 499-505, 2000.

Athanasios Nikolaidis et al, "Facial feature extraction and pose determination", Pattern Recognition, vol. 33 pp. 1783-1791, 2000.

Chi, Tai-Shih, Lan-Ying Yeh, and Chin-Cheng Hsu. "Robust emotion recognition by spectro-temporal modulation statisticfeatures." Journal of Ambient Intelligence and Humanized Computing 3.1 (2012): 47-60.

Chi, Taishih, Powen Ru, and Shihab A. Shamma. "Multi resolution spectrotemporal analysis of complex sounds." The Journal ofthe Acoustical Society of America 118.2 (2005): 887-906.

Chinese Action for CN Application No. 201380057316.8, dated Jul. 26, 2017.

Chinese Office Action for CN Application No. 201180069832.3, dated Sep. 22, 2014.

Chris Ziegler, "Tobii and Lenovo show off prototype eye-controlled laptop, we go eyes-on (video)" downloaded from the Internet, downloaded from <http://www.engadget.com/2011/03/01/tobii-and-lenovo-show-off-prototype-eye-controlled-laptop-we-go/>, Mar. 1, 2011.

Co-pending U.S. Appl. No. 14/307,426, to Ozlem Kalinli-Akbacak, filed Jun. 17, 2014.

Dagen Wang et al. "Robust Speech Rate Estimation for Spontaneous Speech", IEEE Transactions on Audio, Speech, and Language Processing, vol. 15, No. 8, Nov. 2007.

(56) References Cited

OTHER PUBLICATIONS

El Ayadi, Moataz, Mohamed S. Kamel, and Fakhri Karray. "Survey on speech emotion recognition: Features, classificationschemes, and databases." Pattern Recognition 44.3 (2011): 572-587.
Erik Murphy-Chutorian, "Head Pose Estimation in Computer Vision: A Survey", IEEE Transactions on Pattern Analysis and Machine Intelligence, vol. 31, No. 4, pp. 607-626, 2009.
European Search Report for Application No. PCT/US2013071337, dated Mar. 21, 2016.
Extended European Search Report dated Jul. 3, 2012 issued for European Patent Application No. 12162896.0.
Ezzat, Tony, Jake V. Bouvrie, and Tomaso Poggio. "Spectrotemporal analysis of speech using 2-d Gabor filters." INTERSPEECH.2007.
Final Office Action for U.S. Appl. No. 13/901,426, dated Apr. 24, 2015.
Hamed Ketabdar et al: "Enhanced Phone Posteriors for Improving Speech Recognition Systems", IEEE Transactions on Audio, Speech Andlanguage Processing, IEEE Service Center, New York, NY, USA, vol. 18, No. 6, Aug. 1, 2010 (Aug. 1, 2010), pp. 1094-1106, XP011329180, ISSN: 1558-7916, DOI: 10.1109/TASL.2009.2023162, Abstract.
Hamed Ketabdar et al: "Enhanced Phone Posteriors for Improving Speech Recognition Systems", IEEE Transactions on Audio, Speech and Language Processing, IEEE Service Center, New York, NY, USA, vol. 18, No. 6, Aug. 1, 2010 (Aug. 1, 2010), pp. 1094-1106, XP011329180, ISSN: 1558-7916, DOI: 10.1109/TASL.2009.2023162 (Abstract).
Harding, Sue, Martin Cooke, and Peter Konig. "Auditory gist perception: an alternative to attentional selection of auditorystreams?" Attention in Cognitive Systems. Theories and Systems from an Interdisciplinary Viewpoint. Springer BerlinHeidelberg, 2007. 399-416.
He, Ling, et al. "Study of empirical mode decomposition and spectral analysis for stress and emotion classification in naturalspeech." Biomedical Signal Processing and Control 6.2 (2011): 139-146.
Henning Risvik, "Principal Component Analysis (PCA) & NIPALS algorithm", May 10, 2007, dowloaded from http://share.auditory.ru/2006/Ivan.Ignatyev/AD/pca_nipals.pdf.
IBM, "Cell Broadband Engine Architecture", Oct. 2007, downloaded from the web, https://www-01.ibm.com/chips/techlib/techlib.nsf/techdocs/1AEEE1270EA2776387257060006E61BA/$file/CBEA_v1.02_11Oct2007_pub.pdf.
International Search Report & Written Opinion in International Application No. PCT/US2011/052192 dated Apr. 9, 2012.
International Search Report and Written Opinion for International Application No. PCT/US2013/064701, dated Feb. 20, 2014.
International Search Report and Written Opinion for International Application No. PCT/US2013/071337, dated Mar. 27, 2014.
International Search Report issued date Mar. 8, 2012 for International Application No. PCT/US/2011/059004.
Intonation in linguistic: http://en.wikipedia.org/wiki/Intonation_(linguistics), downloaded from web Jun. 4, 2012.
Intonation in linguistic: http://en.wikipedia.org/wiki/Intonation_(linguistics).
Japanese Office Action for JP Application No. 2015-544138, dated Feb. 1, 2017.
Japanese Office Action for JP Patent Application No. 2014-502540, dated Mar. 6, 2015.
Kalinli 0.: "Automatic Phoneme Segmentation Using Auditory Attention Cues II" Proceedings Interspeech 2012, Sep. 9, 2012 (Sep. 9, 2012),-Sep. 13, 2012 (Sep. 13, 2012), XP002755061, Portland, Oregon, USA (Figure 2, Section 2, Section 5, Second paragraph, Lines 3-5).
Kalinli 0.: "Automatic Phoneme, Segmentation Using Auditory Attention Cues II", Proceedings Interspeech 2012, Sep. 9, 2012 (Sep. 9, 2012), -Sep. 13, 2012 (Sep. 13, 2012), XP002755061, Portland, Oregon, USA (Figure 2, Section 2. Section 5. Second paragraph, Lines 3-5).

Kalinli 0.: "Combination of Auditory Attention Features with Phone Posteriors for Better Automatic Phoneme Segmentation", Proceedings Interspeech 2013, Aug. 25, 2013 (Aug. 25, 2013),-Aug. 29, 2013 (Aug. 29, 2013), KP002755062, Lyon, France, the whole document.
Kalinli 0.: "Combination of Auditory Attention Features with Phone Posteriors for Better Automatic Phoneme Segmentation", Proceedings Interspeech 2013, Aug. 25, 2013 (Aug. 25, 2013)-Aug. 29, 2013 (Aug. 29, 2013), KP002755062, Lyon, France (Whole Document).
Kalinli et al., 'prominence detection using auditory attention cues and task-dependent high level information', IEEE, transaction on audio, speech, and language processing, vol. 17, No. 5 Jul. 2009.
Kalinli et al., 'saliency-driven unstructured acoustic scene classification using latent perceptual indexing, IEEE, MMSP'09, Oct. 5-7, 2009.
Kalinli, Ozlem, and Shrikanth Narayanan. "A top-down auditory attention model for learning task dependent influences onprominence detection in speech." Acoustics, Speech and Signal Processing, 2008. ICASSP 2008. IEEE InternationalConference on. IEEE, 2008.
Kalinli, Ozlem, and Shrikanth S. Narayanan. "A saliency-based auditory attention model with applications to unsupervisedprominent syllable detection in speech." INTERSPEECH. 2007.
Kayser, Christoph, et al. "Mechanisms for allocating auditory attention: an auditory saliency map." Current Biology 15.21 (2005):1943-1947.
Non Final Office Action dated Sep. 17, 2013 issued for U.S. Appl. No. 13/078,866.
Non Final Office Action for U.S. Appl. No. 12/943,774, dated Jul. 1, 2013.
Non-Final Office Action for U.S. Appl. No. 13/655,825, dated Aug. 26, 2014.
Non-Final Office Action for U.S. Appl. No. 13/655,834, dated Sep. 5, 2014.
Non-Final Office Action for U.S. Appl. No. 13/901,426, dated Jun. 21, 2016.
Non-Final Office Action for U.S. Appl. No. 14/307,426, dated Jun. 18, 2015.
Non-Final Office Action for U.S. Appl. No. 13/901,426, dated Oct. 8, 2014.
Yaodong Zhang et al., "Speech Rhythm Guided Syllable Nuclei Detection", ICASSP 2009. IEEE International Conference on Acoustics, Speech and Signal Processing, pp. 3797-3800, Apr. 19-24, 2009.
Notice of Allowance for U.S. Appl. No. 12/943,774, dated Oct. 28, 2013.
Notice of Allowance for U.S. Appl. No. 13/078,886, dated Feb. 3, 2014.
Notice of Allowance for U.S. Appl. No. 13/655,834, dated Jan. 2, 2015.
Notice of Allowance for U.S. Appl. No. 13/655,825, dated Jan. 21, 2015.
Notice of Allowance for U.S. Appl. No. 13/901,426, dated Jan. 18, 2017.
Notice of Allowance for U.S. Appl. No. 14/307,426, dated Oct. 1, 2015.
Ozlem Kalinli, U.S. Appl. No. 12/943,774, filed Nov. 10, 2010.
Qiang Ji et al, "3D face pose estimation and tracking from a monocular camera" in Image Vision and Computing, vol. 20m Issue 7, May 1, 2002, pp. 499-511.
Schuller, Bjorn, et al. "Recognising realistic emotions and affect in speech: State of the art and lessons learnt from the Irstchallenge." Speech Communication 53.9 (2011): 1062-1087.
T. Nagarajan et al. "Segmentation of speech into syllable-like units", Department of Computer Science and Engineering Indian Institute of Technology, Madras, Eurospeech 2003—Geneva.
Tone in linguistic: http://en.wikipedia.org/wiki/Tone_(linguistics), downloaded from web Jun. 4, 2012.
Wu, Siqing, Tiago H. Falk, and Wai-Yip Chan. "Automatic speech emotion recognition using modulation spectral features."Speech Communication 53.5 (2011): 768-785.

(56) References Cited

OTHER PUBLICATIONS

Yaodong Zhang et al. "Speech Rhythm Guided Syllable Nuclei Detection" MIT Computer Science and Artificial Intelligence Laboratory, Cambridge, Massachusetts 02139, USA {ydzhang, glass}@csail.mit.edu.

* cited by examiner

USING MACHINE LEARNING TO CLASSIFY PHONE POSTERIOR CONTEXT INFORMATION AND ESTIMATING BOUNDARIES IN SPEECH FROM COMBINED BOUNDARY POSTERIORS

PRIORITY CLAIM

This application is a continuation of U.S. patent application Ser. No. 13/901,426, filed May 23, 2013. U.S. patent application Ser. No. 13/901,426 claims the priority benefit of commonly owned, U.S. Provisional Patent Application No. 61/731,403, to Ozlem Kalinli, filed Nov. 29, 2012, and entitled "COMBINING AUDITORY ATTENTION CUES WITH PHONEME POSTERIOR SCORES FOR PHONE/VOWEL/SYLLABLE BOUNDARY DETECTION," the entire disclosure of which is incorporated herein by reference.

CROSS REFERENCE TO RELATED APPLICATIONS

This application is related to commonly owned, co-pending U.S. Non-Provisional patent application Ser. No. 13/078,866, to Ozlem Kalinli et al., filed Apr. 1, 2011, and entitled "SPEECH SYLLABLE/VOWEL/PHONE BOUNDARY DETECTION USING AUDITORY ATTENTION CUES," the entire disclosure of which is herein incorporated by reference.

BACKGROUND OF THE DISCLOSURE

Segmentation of continuous speech into segments is beneficial for many applications including speech analysis, automatic speech recognition (ASR) and speech synthesis. However, for example, manually determining phonetic transcriptions and segmentations requires expert knowledge and this process is laborious and expensive for large databases. Thus, many automatic segmentation and labeling methods have been proposed in the past to tackle this problem.

Proposed methods include [1] S, Dusan and L. Rabiner, "On the relation between maximum spectral transition positions and phone boundaries," in *Proc. ofICSLP,*2006 (hereinafter "Reference [1]"); [2] v.Qiao, N, Shimomura, and N, Minematsu, "Unsupervised optimal phoneme segmentation: objectives, algorithm and comparisons," in *Proc. ofICASSP,* 2008 (hereinafter "Reference [2]"); [3] F. Brugnara, D, Falavigna, and M, Omologo, "Automatic segmentation and labeling of speech based on hidden markov models," *Speech Communication,* vol. 12, no, 4, pp, 357-370, 1993 (hereinafter "Reference [3]"); [4] A. Sethy and S, S, Narayanan, "Refined speech segmentation for concatenative speech synthesis," in *Proc. ofICSLP,* 2002 (hereinafter "Reference [4]"); and [5] v. Estevan, V, Wan, and O, Scharenborg, "Finding maximum margin segments in speech," in *Proc. ofICASSP,* 2007 (hereinafter "Reference [5]").

These proposed methods correspond to references [1, 2, 3, 4, 5] cited in a phoneme segmentation paper entitled "*Automatic Phoneme Segmentation Using Auditory Attention Features*" by Ozlem Kalinli, INTERSPEECH 2012, 13$^{th}$ Annual Conference of the International Speech Communication Association, Portland, Oreg., USA, Sep. 9-13, 2012, which is incorporated herein by reference.

A first group of proposed segmentation methods require transcriptions, which is not always available. When the transcription is not available, one may consider using a phoneme recognizer for the segmentation. However, speech recognition techniques like HMMs cannot place phone boundaries accurately since they are optimized for the correct identification of the phone sequence. See Reference [4]. A second group of methods does not require any prior knowledge of transcription or acoustic models of phonemes. But, usually their performance is limited.

It is within this context that aspects of the present disclosure arise.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Boundary detection methods have been proposed using auditory attention features. To further improve the boundary accuracy, phoneme posteriors can be combined with auditory attention features. Phoneme posteriors are obtained by training a model (for example a deep neural network) which estimates phoneme class posterior score given acoustic features (mfcc, mel filterbank etc.). It is known that usually around the boundaries these models' phoneme classification accuracy drops since the posteriors tend to become confused with each other, i.e., at a boundary of a phoneme segment there is typically no clear winner class, whereas in the middle of a phoneme segment, the winner (e.g., the maximum of posterior scores) is clear cut. This is indeed very useful information for boundary detection purposes. It is proposed that by combining phoneme posteriors with auditory attention features, boundary detection performance can be further improved. Phoneme posteriors of the current frame can be used for this purpose. In addition, neighboring frames' posteriors' may further help to improve the performance as well by using context information.

In the present disclosure, a novel segmentation method that combines auditory attention features with phone posteriors is proposed. The algorithm does not require transcription and can accurately perform segmentation.

A boundary detection method using only auditory attention features has been described in U.S. patent application Ser. No. 13/078,866, filed Apr. 1, 2011, the entire contents of which are incorporated herein by reference. To further improve the boundary accuracy, phoneme posteriors may be combined with auditory attention features. Phoneme posteriors may be obtained by training a model (for example a deep neural network) which estimates phoneme class posterior score given acoustic features (mfcc, mel filterbank etc.). It is known that usually around the boundaries these models phoneme classification accuracy drops since the posteriors become more confusable with each other. For example, when the phoneme posterior is around a boundary there is no clear winner class, whereas in the middle of a phoneme segment, the winner (e.g., max of posterior scores) is clear cut. This is indeed very useful information for boundary detection purpose. Hence, here it's proposed that by combining phoneme posteriors with auditory attention features, boundary detection performance can be further improved. Phoneme posteriors of a current frame can be used for this purpose. In addition, neighboring frames' posteriors' may further help to improve the performance as well by using context information.

Discussion

In aspects of the present disclosure a signal corresponding to recorded audio may be analyzed to determine boundaries, such as phoneme boundaries. Such boundary detection may be implemented by extracting auditory attention features from the signal and extracting phoneme posteriors from the signal. The auditory attention features and phoneme posteriors may then be combined to detect boundaries in the signal. The details of the present disclosure may be summarized as follows: first auditory attention features extraction are described. Then phone posterior extraction is described. Then two proposed approaches for combining auditory attention features and phoneme posteriors for boundary detection are discussed.

In the present disclosure, a novel method that uses auditory attention cues for phoneme segmentation of speech is proposed. Without being limited to any theory of operation the motivation behind the proposed method is as follows. In a speech spectrum, one can usually see edges and local discontinuities around phoneme boundaries, especially around vowels since they exhibit high energy and clear formant structure. For example, in FIG. 1 of the paper "Automatic Phoneme Segmentation Using Auditory Attention Features" mentioned above, a spectrum of a speech segment which is transcribed as "his captain was" is shown together with approximate phoneme boundaries. In the spectrum, one can visually observe some of these boundaries that correspond to phoneme boundaries such as the boundaries for vowels ih, ae, ix etc. Hence, it is believed that by detecting the relevant oriented edges and discontinuities in the auditory spectrum; i.e. as done visually, phoneme segments and/or boundaries in speech can be located.

Extracting Auditory Attention Features

Auditory attention cues are biologically inspired and extracted by mimicking the processing stages in the human auditory system. A set of multi-scale features is extracted from the sound spectrum using 2D spectro-temporal filters based on the processing stages in the central auditory system and converted to low-level auditory gist features. Different than the prior work in the literature, the auditory attention model analyzes 2D spectrum of sound like an image for detecting edges and local temporal and spectral discontinuities. Hence, it successfully detects boundaries in speech.

In the auditory attention model, the auditory spectrum may be regarded as analogous to an image of a scene in vision and contrast features are extracted from the spectrum in multiple scales using 2D spectro-temporal receptive filters. The extracted features may be tuned to different local oriented edges: e.g., frequency contrast features may be tuned to local horizontally oriented edges, which are good for detecting and capturing formants and their changes. Next, low level auditory gist features can be obtained and a neural network can be used to discover the relevant oriented edges and to learn the mapping between the gist features and phoneme boundaries.

Extracting auditory attention cues from an input speech signal may proceed as follows. First spectrum may be computed based on an early auditory system model or fast Fourier transform (FFT). Multi-scale features may then be extracted based on the central auditory system. Center-surround differences may then be computed and fine and coarser scales may be compared. Auditory gist features may be computed by dividing each feature map into m-by-n grids, and computing a mean of each sub-region of the grid. Dimension and redundancy of the auditory gist features may then be reduced, e.g., using principle component analysis (PCA) and/or discrete cosine transform (DCT). The dimension reduction and redundancy reduction produces final features referred to herein as an auditory gist.

Figure 1A:
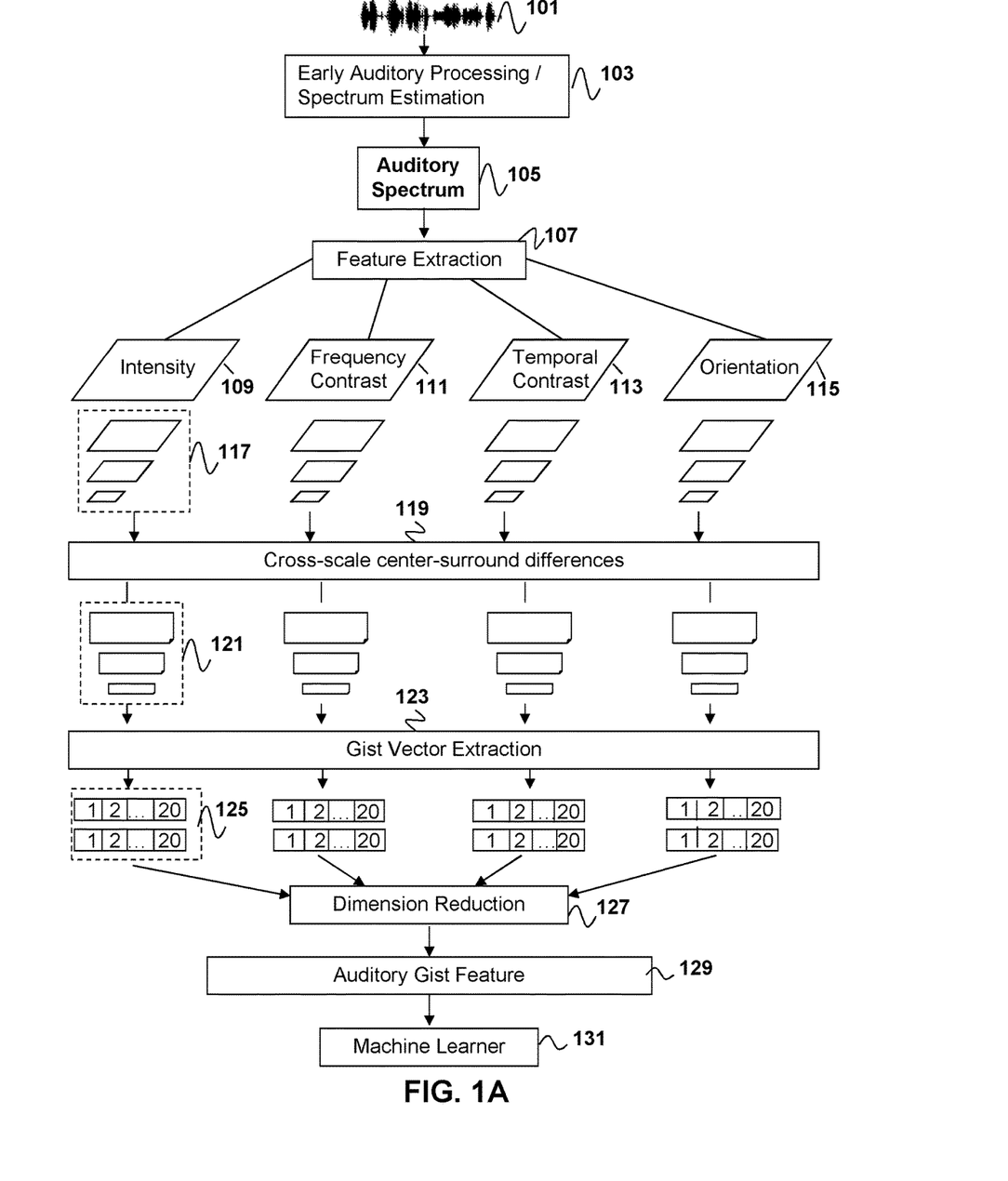
FIG. 1A is a flow diagram illustrating a method for syllable/vowel/phone boundary detection in speech according to an embodiment of the present invention.
Figure 1B:
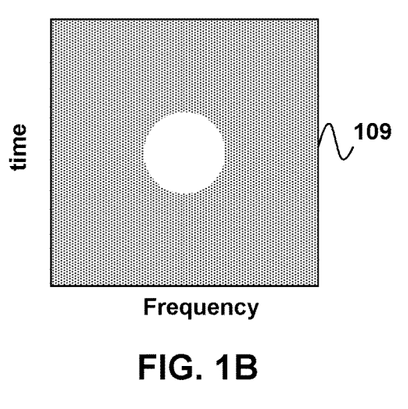
FIGS. 1B-1F are schematic diagrams illustrating examples of spectro-temporal receptive filters that can be used in embodiments of the present invention.
Figure 1C:
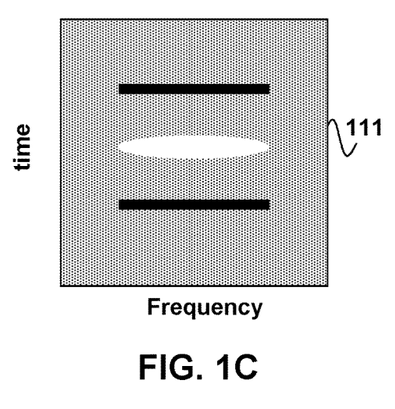
Figure 1D:
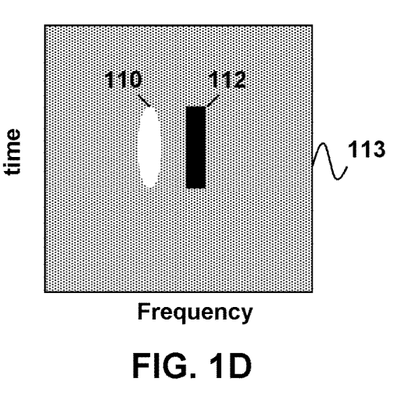

Details of the auditory feature extraction are described in U.S. patent application Ser. No. 13/078,866. A block-diagram of the attention model and flow diagram of feature extraction is shown in FIG. 1A. The flow diagram in FIG. 1A illustrates a method for syllable/vowel/phone boundary detection in speech using auditory attention cues according to aspects of the present disclosure. The auditory attention model is biologically inspired and mimics the processing stages in the human auditory system. It is designed to determine when and where sound signals attract human attention.

Initially an input window of sound 101 is received. By way of example, and not by way of limitation, this input window of sound 101 may be captured over a time window of some finite duration using a microphone which acts to convert the acoustic waves that characterize a particular input window of sound 101 into an electric signal for further processing. The input window of sound 101 may be any segment of a person's speech. By way of example, and not by way of limitation, the input window of sound 101 may contain a single syllable, word, sentence, or any combination of these.

The input window of sound 101 is then passed through a set of processing stages 103 that operate to convert this window of sound 101 into an audio spectrum 105. These processing stages 103 can be based on the early processing stages of an auditory system, such as the human auditory system. By way of example, and not by way of limitation, the processing stages 103 may consist of cochlear filtering, inner hair cell, and lateral inhibitory stages mimicking the process from basilar membrane to the cochlear nucleus in the auditory system. The cochlear filtering may be implemented using a bank of 128 overlapping constant-Q asymmetric band pass filters with center frequencies that are uniformly distributed along a logarithmic frequency axis. These filters may be implemented by suitably configured electronic hardware, which may be purpose-built. Alternatively, the filters may be implemented on a general-purpose computer programmed with software that implements the functions of the filters. For analysis, 20 ms frames of audio with 10 ms shift can be used, which result in each audio frame being represented by a 128 dimensional vector.

Once the input window of sound 101 has been converted into an auditory spectrum 105, the spectrum 105 is analyzed by extracting multi-scale features 117, as indicated at 107, by mimicking the information processing stages in the central auditory system. Auditory attention can be captured by or voluntarily directed to a wide variety of acoustical features such as intensity (or energy), frequency, temporal, pitch, timbre, FM direction or slope (called "orientation" here), etc. These features can be selected and implemented to mimic the receptive fields in the primary auditory cortex.

By way of example, and not by way of limitation, four features that can be included in the model to encompass the aforementioned features are intensity (I), frequency contrast (F), temporal contrast (T), and orientation ($O_\theta$) with $\theta=\{45°, 135°\}$. The intensity feature captures signal characteristics related to the intensity or energy of the signal. The frequency contrast feature captures signal characteristics related to spectral (frequency) changes of the signal. The temporal contrast feature captures signal characteristics related to temporal changes in the signal. The orientation filters are sensitive to moving ripples in the signal.

Each feature may be extracted using two-dimensional spectro-temporal receptive filters 109, 111, 113, 115, which mimic the certain receptive fields in the primary auditory cortex. FIGS. 1B-1F respectively illustrate examples of the receptive filters (RF) 109, 111, 113, 115. Each of the receptive filters (RF) 109, 111, 113, 115 simulated for feature extraction is illustrated with gray scaled images corresponding to the feature being extracted. An excitation phase 110 and inhibition phase 112 are shown with white and black color, respectively.

Each of these filters 109, 111, 113, 115 is capable of detecting and capturing certain changes in signal characteristics. For example, the intensity filter 109 illustrated in FIG. 1B may be configured to mimic the receptive fields in the auditory cortex with only an excitatory phase selective for a particular region, so that it detects and captures changes in intensity/energy over the duration of the input window of sound. Similarly, the frequency contrast filter 111 depicted in FIG. 1C may be configured to correspond to receptive fields in the primary auditory cortex with an excitatory phase and simultaneous symmetric inhibitory sidebands. The temporal contrast filter 113 illustrated in FIG. 1D may be configured to correspond to the receptive fields with an inhibitory phase and a subsequent excitatory phase.

Figure 1E:
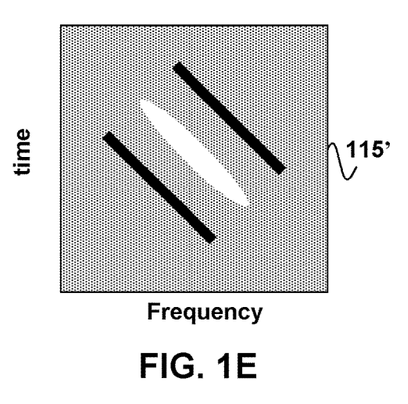

It can be thought that the auditory spectrum is analogous to an image of a scene in vision and some of these features are tuned to different local oriented edges; i.e. frequency contrast features are tuned to local horizontally oriented edges, which can be good for detecting and capturing formants and their changes. In other words, the frequency contrast filter 111 shown in FIG. 1C detects and captures spectral changes over the duration of the sound window. The temporal contrast filter 113 shown in FIG. 1D detects and captures changes in the temporal domain. The orientation filters 115' and 115" mimic the dynamics of the auditory neuron responses to moving ripples. The orientation filter 115' can be configured with excitation and inhibition phases having 45° orientation as shown in FIG. 1E to detect and capture when ripple is moving upwards.

Figure 1F:
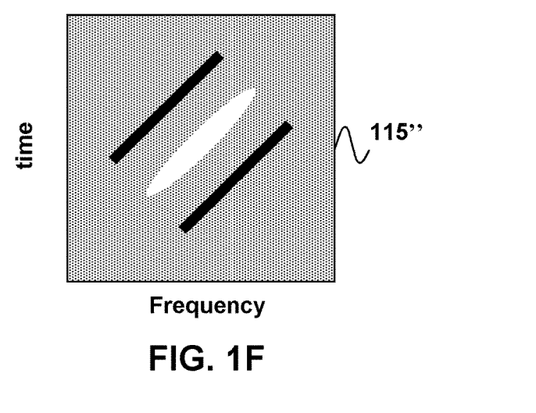

Similarly, the orientation filter 115" can be configured with excitation and inhibition phases having 135° orientation as shown in FIG. 1F to detect and capture when ripple is moving downwards. One important point is that in the model the feature contrast is computed rather than the absolute feature strength, which is crucial for change point/boundary detection and segmentation.

The RF for generating frequency contrast 111, temporal contrast 113 and orientation features 115 can be implemented using two-dimensional Gabor filters with varying angles. The filters used for frequency and temporal contrast features can be interpreted as horizontal and vertical orientation filters, respectively, and can be implemented with two-dimensional Gabor filters with 0° and 90°, orientations. Similarly, the orientation features can be extracted using two-dimensional Gabor filters with $\{45°, 135°\}$ orientations. The RF for generating the intensity feature 109 is implemented using a two-dimensional Gaussian kernel.

The feature extraction 107 is completed using a multi-scale platform. The motivation for generating a scale-space representation of a given data set originates from the basic observation that objects are composed of different structures at different scales. For a system analyzing an unknown set of data, there is no way to know a priori what scales are appropriate for describing the interesting structures associated with the data. The only reasonable approach is thus to consider descriptions at multiple scales in order to capture the unknown scale variations that may occur. In embodiments of the present invention, the multi-scale features 117 may be obtained using a dyadic pyramid (i.e., the input spectrum is filtered and decimated by a factor of two, and this is repeated). As a result, eight scales are created (if the window duration is larger than 1.28 seconds, otherwise there are fewer scales), yielding size reduction factors ranging from 1:1 (scale 1) to 1:128 (scale 8).

After multi-scale features 117 are obtained, feature maps 121 are generated as indicated at 119 using those multi-scale features 117. This is accomplished by computing "center-surround" differences, which involves comparing "center" (fine) scales with "surround" (coarser) scales. The center-surround operation mimics the properties of local cortical inhibition and detects the local temporal and spatial discontinuities. It is simulated by across scale subtraction ($\theta$) between a "center" fine scale (c) and a "surround" coarser scale (s), yielding a feature map M (c, s):M (c, s)= $|M(c)\theta M(s)|, M \in \{I, F, T, O_\theta\}$. The across scale subtraction between two scales is computed by interpolation to the finer scale and point-wise subtraction. By way of example, and not by way of limitation, $c=\{2, 3, 4\}$, $s=c+\delta$, with $\delta \in \{3, 4\}$ may be used, which results in a total of 30 feature maps when features are extracted at eight scales.

Next, an "auditory gist" vector 125 may be extracted as indicated at 123 from each feature map 121 of I, F, T, $O_\theta$, such that the sum of auditory gist vectors 125 covers the entire input sound window 101 at low resolution. To determine the auditory gist vector 125 for a given feature map 121, the feature map 121 is first divided into an m-by-n grid of sub-regions, and statistics, such as maximum, minimum, mean, standard deviation etc., of each sub-region can be computed. By way of example, and not by way of limitation, the mean of each sub-region can be computed to capture the overall properties of the map. For a feature map $M_i$, with height h and width w, the computation of the auditory gist vector can be written as:

$$G_i^{k,l} = \frac{mn}{wh} \sum_{u=\frac{kw}{n}}^{\frac{(k+1)w}{n}-1} \sum_{v=\frac{lh}{m}}^{\frac{(l+1)h}{m}-1} M_i(u, v),$$

for $$k = \{0, \ldots, n-1\}, l = \{0, \ldots, m-1\}.$$

An example of auditory gist vector extraction 123 with m=4, n=5 is shown in FIG. 1, where a 20-dimensional auditory gist vector may be used to represent a feature map. These particular values of m and n are provided as for the sake of example and not as limitations on any embodiment of the invention.

After extracting an auditory gist vector 125 from each feature map 121, the auditory gist vectors may be augmented and combined to create a cumulative gist vector. The cumulative gist vector may then undergo a dimension reduction 127 to reduce dimension and redundancy in order to make syllable/vowel/phone boundary detection more practical. By way of example and not by way of limitation, principal component analysis (PCA) can be used for the dimension reduction 127. The result of the dimension reduction 127 is a final feature, referred to herein as an auditory gist feature 129 that conveys the information in the cumulative gist vector in fewer dimensions. PCA is commonly used as a primary technique in pattern recognition. As is generally understood, PCA is mathematically defined as an orthogonal linear transformation that transforms data to a new coordinate system such that the greatest variance by any projection of the data comes to lie on the first coordinate (called the first principal component), the second greatest variance on the second coordinate, and so on. PCA may be implemented on a computer programmed with suitably configured software. Examples of commercially available software that can implement dimension reduction through PCA include Matlab by MathWorks, Inc. of Natick, Mass., U.S.A. or Weka machine learning software, developed at the University of Waikato, New Zealand. Alternatively, other linear and non-linear dimension reduction techniques, such as factor analysis, kernel PCA, linear discriminant analysis (LDA) and the like, may be used to implement the dimension reduction 129.

After the auditory gist feature 127' that characterizes the input sound window 101 has been determined, phone boundaries, vowel boundaries, syllable nucleus, or syllable boundaries may be detected from the auditory gist features and phone posteriors. To perform such detection on a given input sound window, a machine learning algorithm 131, such as a neural network, nearest neighbor classifier, decision tree, and the like, can be used to classify boundaries, such as phone boundaries, vowel boundaries, syllable nucleus, or syllable boundaries. By way of example and not by way of limitation, a neural network can be used as the machine learning algorithm 131 since it is biologically well motivated. In such a case, the neural network 131 can identify the phone boundaries, vowel boundaries, syllable nucleus, or syllable boundaries within the input sound given the cumulative gist vector it is associated with.

As used herein, the term "neural network" refers to an interconnected group of natural or artificial neurons that uses a computational/mathematical model for information processing based on a connectionistic approach to computation. Neural networks are adaptive systems that change structure based on external or internal information that flows through the network. They are used to implement non-linear statistical data modeling and may be used to model complex relationships between inputs and outputs.

The neural network output estimate can be used in two ways: i) hard decision ii) soft decision. In hard decision, the neural network's final decision is used as a binary decision; e.g., if there is a boundary at a frame, then it outputs one, otherwise zero. In the soft decision, the neural network probability score, which is a value between [0,1], can be used as a posterior probability of the current frame being a boundary given the attention features. Also, in the soft decision, the estimated posterior probability can be fed into another system and combined with information from another source to further improve either system's performance. For example, boundary information can be used to improve speech recognition performance or complementary information from a speech recognition engine can be used to further improve the boundary detection performance, etc. In addition, certain embodiments of the present invention can optionally also provide information about the number of syllables in a segment; e.g., the number of syllables per second or per utterance, which can be used for estimating a speaking rate. Then, the estimated speaking rate can be used to improve other spoken language processing applications such as; to improve speech recognition performance by selecting appropriate acoustic models based on the speech rate, or finding emotional segments of speech, etc.

The syllable/phone/vowel boundary information can be used alone or to improve other spoken language processing systems such as speech recognition. Also, one can think the phone/vowel/syllable boundary as a hierarchical system. Information from one type of boundary can also be used to improve another type of boundary; i.e. vowel boundary information can be used to improve phone or syllable boundary detection. Also, embodiments of the present invention can be used for analysis of all types of speech and speaking styles and noise conditions; i.e. isolated speech, continuous speech, spontaneous speech, read speech, clean/noisy speech etc.

Phone Posteriors:

Extraction of phone posteriors is similar to a phone recognizer. Basically, acoustic features are extracted from speech and a model or phone models is/are trained to learn the mapping between features and phones.

By way of example, and not by way of limitation, phone posteriors may be extracted every frame as follows. First acoustic features used for phone classification may be extracted for each speech frame. Speech may be processed using a shifting window; e.g., acoustic features may be extracted every 10 milliseconds (ms). Features may be MFCC, mel-filterbank features, PLP, auditory attention features, prosodic features, etc., or combinations thereof. To capture the context, features of multiple frames can be augmented to form a larger dimensional feature vector. Typically the number of frames may vary from about 9-25 frames. Then a machine learning algorithm can be used to learn the mapping between features and phone classes; for example, a neural network, svn, HMM, DBN (deep belief network) are among such types of tools used for phone classification or recognition.

By way of example, and not by way of limitation, a state-of-the-art phone classifier described in "*Deep Learning of Speech Features for Improved Phonetic Recognition*" by J. Lee and S.-Y. Lee, Interpseech 2011, may be used to obtain phone posteriors.

As a numerical example, a 25 ms analysis window may be used with a 10 ms shift to extract 26 band log-Mel spectrum features. 21 consecutive frames, which correspond to 210 ms of time context, may be augmented to create a 546 dimensional feature vector. Features may be mean and variance normalized before being fed into the DBN.

By way of example, the DBN may have one input layer with linear units (take 546 inputs), 3 hidden layers with 1000 binary units, and one output layer with normal logistic units. In experiments, the original 61 TIMIT phone classes were used. However, since sub-phoneme representation improves modeling, the sub-phoneme representation for phonemes may also be used. It is assumed that each phoneme has 3 temporal states; hence the output layer of DBN has 61×3=183 outputs.

For training the DBN, a TIMIT training data set can be used. To obtain sub-phoneme labels, uniform segmentation is performed at first. After the network converges, realignment of the states is done by the Viterbi forced-alignment. The algorithm is characterized by layers of simple generative models initialized layer-by-layer in an unsupervised way (pre-training), followed by the discriminative retraining of the whole layer using supervised techniques. Pre-training each layer from the lower one to the upper one is done using unsupervised learning algorithm based on the Restricted Boltzmann Machine (RBM), and the final supervised training may be done using the well-known error back-propagation algorithm to fine-tune the network for its final classification. The training is repeated until the model parameters are converged; in other words until the error in the validation set starts to increase. More details of the DBN structured and training procedure can be found in the paper by Lee et al (cited before).

Once the DBN model is trained, it can be used for extracting phone class posteriors. For that, again log-Mel features are extracted from sound. Then features from 21 frames may be augmented for each frame, and fed into the DBN. At the output of the DBN, posterior scores for each state (sub-phoneme) are obtained. To obtain the phoneme posterior score for each frame, the probabilities of 3 states for each phoneme are simply averaged.

Figure 2A:
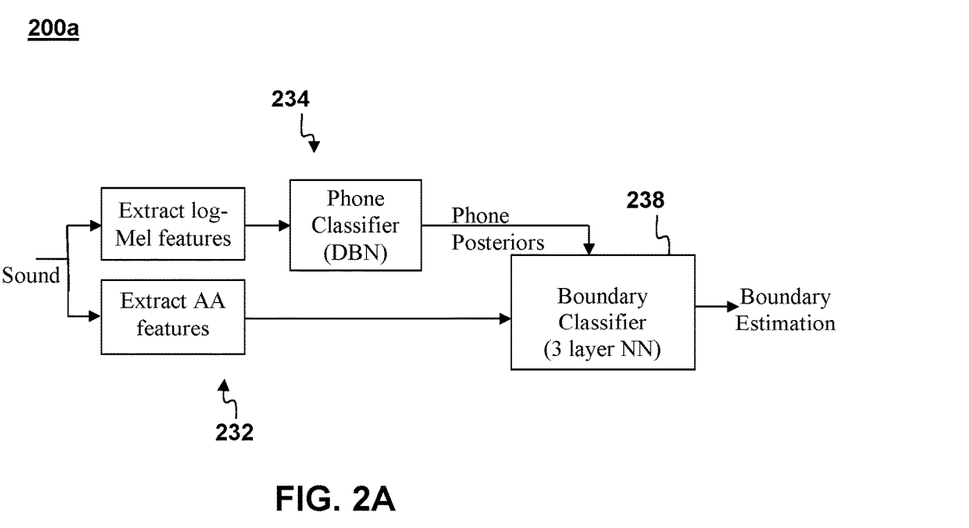
FIG. 2A is a flow diagram illustrating a way of combining auditory attention features with phone posteriors for boundary detection in accordance with aspects of the present disclosure.

Combining Auditory Attention Features with Phone Posteriors for Boundary Detection One method 200a of combining auditory attention features with phone posteriors for boundary detection is illustrated in FIG. 2A. In this technique referred to herein as "early fusion", auditory attention (AA) features 232 and phone posteriors (PP) 234 may be extracted in parallel from a sound signal, e.g., as described above. The AA features and phone posteriors may be augmented and sent to a machine learning algorithm 238, e.g., a three-layer neural network (NN) for boundary estimation.

For example, for phone boundary detection experiments, the TIMIT core test set (192 sentences) may be used for testing and the remaining official test set is used as development data. For the development data, first auditory attention features maybe extracted using AA model. In parallel, 61 phoneme posteriors are extracted for each frame passing log-Mel features from the trained DBN model, which may be trained using TIMIT train set. Then, phoneme posterior scores are normalized to sum up to 1 for each frame.

A three layer neural network 238 is used for phone boundary classification where neural network has D inputs ($D=D_{AA}+D_{PP}$ dimension of AA feature plus dimension of phone posteriors), (N+D)/2 hidden units and, N=2 output units (boundary vs non-boundary). Here when phone posteriors from one single frame are used in conjunction with the DBN described above then $D_{PP}=61$ since there are 61 phone posteriors taken from DBN. Context can also be used to also trace phone boundaries from phone posteriors. For example, the phone with the highest posterior score can be assigned as the phone class for that frame. Similarly, phone classification can be performed for previous or subsequent frames. Then, if the phone index is changing from one frame to another frame, that indicates existence of a boundary. When context is used, phoneme posteriors of neighboring left and/or right frames may also be augmented which will result in a larger feature vector. By way of example, if three context frames (including the current frame and neighboring left and right frames) are used, 61×3=183 phone posteriors are fed to NN where $D_{PP}=183$. Even the estimated phoneme index for the current frame and neighboring frames can be fed into the NN for boundary detection. For example, in certain experiments, single frame, three context frames and five context frames have been used.

Figure 2B:
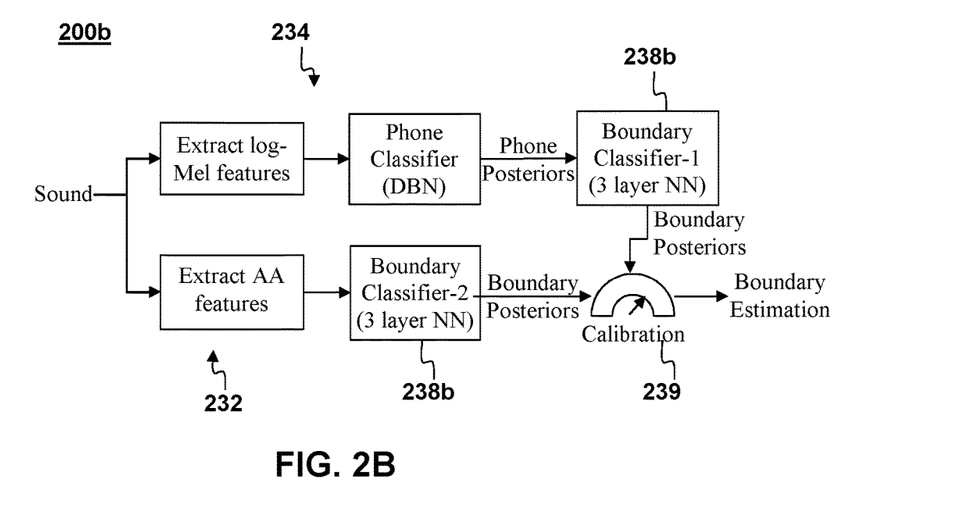
FIG. 2B is a flow diagram illustrating another way of combining auditory attention features with phone posteriors for boundary detection in accordance with aspects of the present disclosure.

In an alternative implementation 200b depicted in FIG. 2B, two boundary classifiers 238a-b may be trained using 1) auditory attention features 238a 2) phone posteriors 238b, respectively. The outputs of these classifiers are the boundary posteriors; e.g., two-dimensional features with a first dimension representing a probability of being boundary and second dimension being a probability of being a non-boundary. During a calibration stage 239 using these boundary posteriors from two different classifiers, performance can be maximized either using regression (i.e. using Logistic linear regression) to find weights that gives best performance, or in a data-driven manner, e.g. using a machine learning algorithm or similar algorithm. Again, context can be used, e.g., neighboring frames boundary probabilities can also be included during the calibration stage.

Experiments

Experiments have been done for phone boundary detection on TIMIT. However, the above idea can also be used for, detection of vowels boundaries and other boundaries in speech such as the end of a vowel, a syllable nucleus, the middle or end of a syllable nucleus, or the end of a syllable.

The neural network returns the probability of that frame being a boundary. Then, a soft decision may be used such that the neural network probability score is used to create a one dimensional curve as a function of time. Then a peak search may be performed on the curve to locate local maxima which are counted as detected boundaries if it is above a threshold. As done in the other methods, a 20 ms error was tolerated around phoneme boundaries if needed.

The threshold may be selected as desired by the next application that will use the boundary information. For example, lowering the threshold would increase the Recall rate (or detect more boundaries) while lowering the precision (there may be more false alarms), whereas increasing the threshold would increase the precision and decrease the recall. Here, simply 0.5 threshold was selected for results in Table I to avoid parameter tuning.

A comparison of results obtained with different methods is shown below. In Table I, the notations "Dusan et al" and "Quiao et al" refer to previous methods described Reference [1] and Reference [2] mentioned above. A DBN frame level phone classification and DBN plus Viterbi decoding for phone recognition are two phoneme boundary detection baselines extracted using DBN directly. In the DBN frame level phone classification, whenever phone class changes from a frame to the subsequent frame, a detected boundary is marked. When phone recognition is employed by passing phoneme posterior scores through a Viterbi decoder, the phoneme string corresponding to an utterance is returned together with their estimated phoneme boundaries. In Table I, phoneme boundary detection results achieved by combining—auditory attention (AA) features and phone posteriors (PP) with x frame posteriors (AA+PP_xf), where x represents the number of frames, are also shown. Results are shown in Table I below.

TABLE I

Segment-level phone boundary detection results on TIMIT using early fusion.

| Method | Recall | Precision | F-score |
|---|---|---|---|
| Dusan et al [1] | 75.2 | 72.73 | 73.94 |
| Quiao et al [2] | 77.5 | 78.76 | 78.13 |
| DBN frame phone class | 92.71 | 66.01 | 77.11 |
| DBN + Viterbi phone dec. | 71.82 | 76.61 | 74.14 |
| AA Features | 80.59 | 80.05 | 81.31 |
| AA + PP_1f | 82.52 | 92.50 | 87.23 |
| AA + PP_3f | 89.16 | 87.71 | 88.43 |

As may be seen from Table I above, combining Auditory Attention with Phoneme Posterior scores improves overall F-score and outperforms baselines and previously reported numbers by providing more than 30% relative improvement.

Combining Auditory Attention with Phoneme Posterior in accordance with aspects of the present disclosure may be used advantageously in various voice recognition (VR) applications. For example, this technique may be used to improve phoneme recognition rate and to improve the robustness of automatic voice recognition (VR). Aspects of the present disclosure may also be used to improve the confidence measure of VR.

Particular applications of aspects of the present disclosure include song or voice search by humming or just single vowel voice. Aspects of the present disclosure may also be used in speech synthesis. Aspects of the present disclosure may also be used to estimate the speaking rate, to estimate the tempo of singing, to improve voice scoring (more general than singing-scoring).

Figure 3:
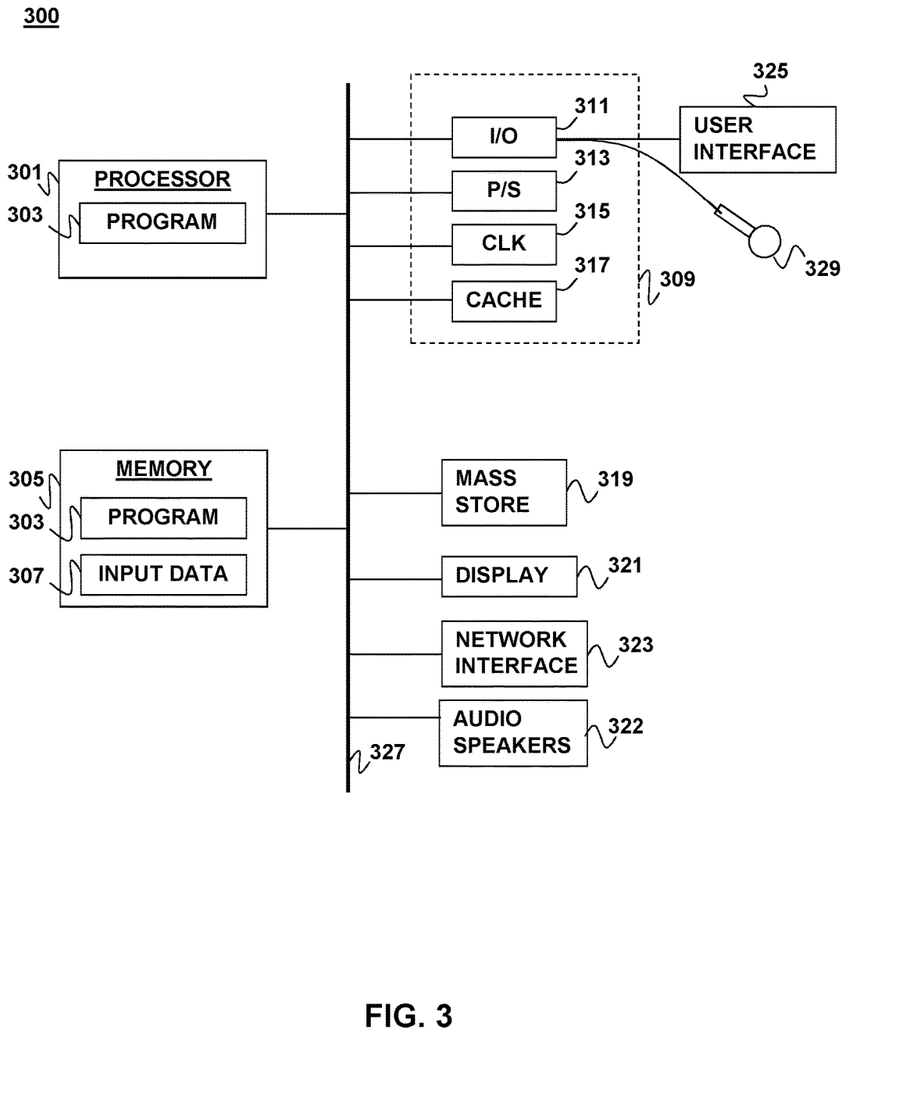
FIG. 3 is a block diagram illustrating an apparatus for syllable/vowel/phone boundary detection in speech according to an embodiment of the present invention

Embodiments of the invention may be implemented on a suitably configured computer apparatus. FIG. 3 illustrates a block diagram of a computer apparatus that may be used to implement a method of phone/syllable/vowel boundary detection using auditory attention cues combined with phoneme posteriors according to an embodiment of the present invention. The apparatus 300 generally may include a processor module 301 and a memory 305. The processor module 301 may include one or more processor cores. An example of a processing system that uses multiple processor modules, is a Cell Processor, examples of which are described in detail, e.g., in Cell Broadband Engine Architecture, which is available online at http://www-306.ibm-.com/chips/techlib/techlib.nsf/techdocs/1AEEE1270EA2776387257060006E61BA/$file/CBEA_01_pub.pdf, which is incorporated herein by reference.

The memory 305 may be in the form of an integrated circuit, e.g., RAM, DRAM, ROM, and the like. The memory 305 may also be a main memory that is accessible by all of the processor modules. In some embodiments, the processor module 301 may have local memories associated with each core. A program 303 may be stored in the main memory 305 in the form of processor readable instructions that can be executed on the processor modules. The program 303 may be configured to perform boundary detection on a window of sound using auditory attention cues combined with phoneme posteriors. The program 303 may be written in any suitable processor readable language, e.g., C, C++, JAVA, Assembly, MATLAB, FORTRAN, and a number of other languages.

Input data 307 may also be stored in the memory. Such input data 337 may include input windows of sound, feature maps, or auditory gist vectors. During execution of the program 303, portions of program code and/or data may be loaded into the memory or the local stores of processor cores for parallel processing by multiple processor cores.

The apparatus 300 may also include well-known support functions 309, such as input/output (I/O) elements 311, power supplies (P/S) 313, a clock (CLK) 315, and a cache 317. The apparatus 300 may optionally include a mass storage device 319 such as a disk drive, CD-ROM drive, tape drive, or the like to store programs and/or data. The device 300 may optionally include a display unit 321, audio speakers unit 322, and user interface unit 325 to facilitate interaction between the apparatus and a user. The display unit 321 may be in the form of a cathode ray tube (CRT) or flat panel screen that displays text, numerals, graphical symbols or images. The user interface 325 may include a keyboard, mouse, joystick, light pen, or other device that may be used in conjunction with a graphical user interface (GUI). The apparatus 300 may also include a network interface 323 to enable the device to communicate with other devices over a network, such as the internet.

In some embodiments, the system 300 may include an optional microphone 329, which may be a single microphone or a microphone array. The microphone 329 can be coupled to the processor 301 via the I/O elements 311. By way of example, and not by way of limitation, different input windows of sound may be recorded using the microphone 329.

The components of the system 300, including the processor 301, memory 305, support functions 309, mass storage device 319, user interface 325, network interface 323, and display 321 may be operably connected to each other via one or more data buses 327. These components may be implemented in hardware, software or firmware or some combination of two or more of these.

There are a number of additional ways to streamline parallel processing with multiple processors in the apparatus. For example, it is possible to "unroll" processing loops, e.g., by replicating code on two or more processor cores and having each processor core implement the code to process a different piece of data. Such an implementation may avoid a latency associated with setting up the loop. As applied to embodiments of the present invention, multiple processors could extract different features from an input sound window in parallel. The intensity extraction filter, frequency contrast extraction filter, temporal contrast extraction filter, and orientation extraction filter could all process the auditory spectrum simultaneously, generating corresponding multi-scale features much more efficiently if implemented on different processor elements in parallel. Furthermore, feature maps could also be generated in parallel, as well as their corresponding auditory gist vectors. The ability to process data in parallel saves valuable processing time, leading to a more efficient and streamlined system for phone/syllable/vowel boundary detection in speech.

Figure 4:
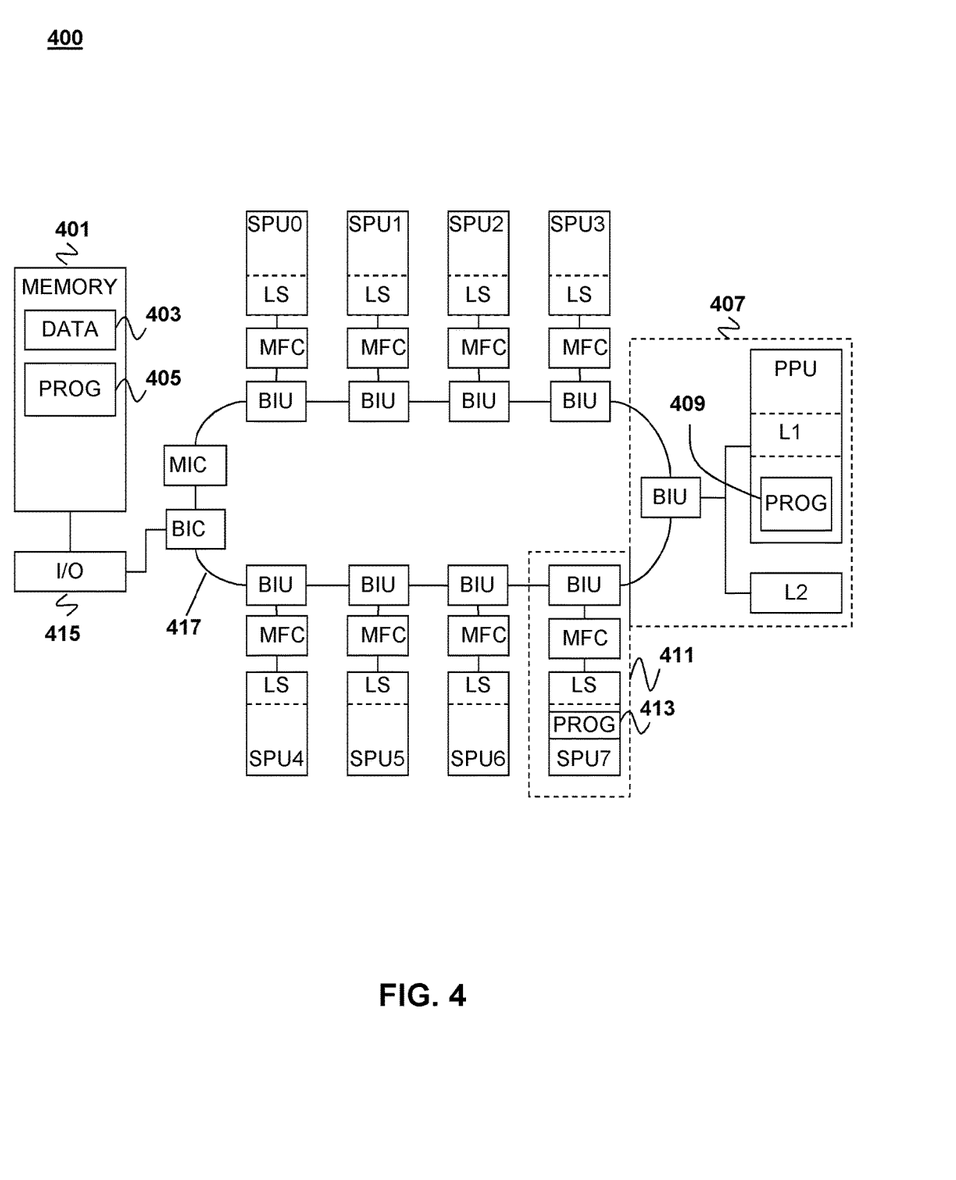
FIG. 4 is a block diagram illustrating an example of a cell processor implementation of an apparatus for syllable/vowel/phone boundary detection in speech according to an embodiment of the present invention.

One example, among others of a processing system capable of implementing parallel processing is known as a cell processor. There are a number of different processor architectures that may be categorized as cell processors. By way of example, and without limitation, FIG. 4 illustrates a type of cell processor. The cell processor 400 includes a main memory 401, a single power processor element (PPE) 407, and eight synergistic processor elements (SPE) 411. Alternatively, the cell processor may be configured with any number of SPEs. With respect to FIG. 4, the memory 401, PPE 407 and SPEs 411 can communicate with each other and with an I/O device 415 over a ring-type element interconnect bus 417. The memory 401 contains input data 403 having features in common with the input data described above and a program 405 having features in common with the program described above. At least one of the SPEs 411 may include in its local store (LS) syllable/vowel boundary detection instructions 413 and/or a portion of the input data that is to be processed in parallel, e.g. as described above. The PPE 407 may include in its L1 cache, syllable/vowel boundary detection instructions 409 having features in common with the program described above. Instructions 405 and data 403 may also be stored in memory 401 for access by the SPE 411 and PPE 407 when needed.

By way of example, and not by way of limitation, different SPE 411 may implement extraction of multi-scale features. Specifically, different SPE 411 may be respectively dedicated to parallel extraction of intensity (I), frequency contrast (F), temporal contrast (T), and orientation ($O_\theta$) features from the spectrum. Similarly, different SPE 411 may respectively implement feature map generation or auditory gist vector extraction for the intensity (I), frequency contrast (F), temporal contrast (T), and orientation ($O_\theta$) features.

By way of example, the PPE 407 may be a 64-bit PowerPC Processor Unit (PPU) with associated caches. The PPE 407 may include an optional vector multimedia extension unit. Each SPE 411 includes a synergistic processor unit (SPU) and a local store (LS). In some implementations, the local store may have a capacity of e.g., about 256 kilobytes of memory for programs and data. The SPUs are less complex computational units than the PPU, in that they typically do not perform system management functions. The SPUs may have a single instruction, multiple data (SIMD) capability and typically process data and initiate any required data transfers (subject to access properties set up by a PPE) in order to perform their allocated tasks. The SPEs 411 allow the system to implement applications that require a higher computational unit density and can effectively use the provided instruction set. Managing a significant number of SPEs 411 by the PPE 407 allows for cost-effective processing over a wide range of applications. By way of example, the cell processor may be characterized by an architecture known as Cell Broadband Engine Architecture (CBEA). In CBEA-compliant architecture, multiple PPEs may be combined into a PPE group and multiple SPEs may be combined into an SPE group. For purposes of example, the cell processor is depicted as having only a single SPE group and a single PPE group with a single SPE and a single PPE. Alternatively, a cell processor can include multiple groups of power processor elements (PPE groups) and multiple groups of synergistic processor elements (SPE groups). CBEA-compliant processors are described in detail, e.g., in *Cell Broadband Engine Architecture*, which is available online at: http://www-306.ibm.com/chips/techlib/techlib.nsf/techdocs/1AEEE1270EA277638725706000E61BA/$file/CBEA_01_pub.pdf, which is incorporated herein by reference.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method, comprising:
    generating combined boundary posteriors from a combination of auditory attention features and the phone posteriors by feeding phone posteriors of neighboring frames of an audio signal into a machine learning algorithm to classify phone posterior context information;
    estimating boundaries in speech contained in the audio signal from the combined boundary posteriors; and
    performing speech recognition on the audio signal using the estimated boundaries.

2. The method of claim 1, wherein feeding phone posteriors of neighboring frames of an audio signal into a machine learning algorithm to classify phone posterior context information includes:
    feeding both auditory attention features and the phone posteriors into a machine learning algorithm of a boundary classifier to output the combined boundary posteriors.

3. The method of claim 2, wherein the machine learning algorithm of the boundary classifier is a three layer neural network.

4. The method of claim 1, wherein feeding phone posteriors of neighboring frames of an audio signal into a machine learning algorithm to classify phone posterior context information includes:
    feeding auditory attention features into a machine learning algorithm of a first boundary classifier to output a first set of boundary posteriors;
    feeding the phone posteriors into a machine learning algorithm of a second boundary classifier to output a second set of boundary posteriors;
    calibrating the first set of boundary posteriors and the second set of boundary posteriors to determine relative weights for the first set of boundary posteriors and a second set of boundary posteriors; and
    assigning the relative weights to the first set of boundary posteriors and the second set of boundary posteriors to output the combined boundary posteriors.

5. The method of claim 4, wherein the machine learning algorithm of the first boundary classifier is a three layer neural network, and the machine learning algorithm of the second boundary classifier is a three layer neural network.

6. The method of claim 4, wherein said calibrating includes determining the relative weights using regression.

7. The method of claim 4, wherein said calibrating includes determining the relative weights using machine learning.

8. The method of claim 1, further comprising extracting the phone by extracting acoustic features from each of the frames of the audio signal; and
    feeding the acoustic features into a machine learning algorithm of a phone classifier to output the phone posteriors.

9. The method of claim 8, wherein the machine learning algorithm of the phone classifier is a deep belief network.

10. The method of claim 8, wherein the acoustic features are log-Mel spectrum features.

11. The method of claim 2, further comprising the extracting auditory attention features by:
   determining an auditory spectrum for an input window of the audio signal;
   extracting one or more multi-scale features from the auditory spectrum, wherein each multi-scale feature is extracted using a separate two-dimensional spectro-temporal receptive filter;
   generating one or more feature maps corresponding to the one or more multi-scale features;
   extracting an auditory gist vector from each of the one or more feature maps;
   obtaining a cumulative gist vector through augmentation of each auditory gist vector extracted from the one or more feature maps; and
   generating the auditory attention features from the cumulative gist vector.

12. The method of claim 1, further comprising generating an input window of the audio signal by digitally sampling the audio signal with a processor for a segment of time corresponding to the input window.

13. The method of claim 1, wherein the estimated boundaries are syllable boundaries, vowel boundaries, phoneme boundaries, or a combination thereof.

14. The method of claim 1 wherein:
   the input window of the audio signal is generated from acoustic waves.

15. The method of claim 1, further comprising converting acoustic waves that characterize an input window of sound into an electric signal to generate the audio signal.

16. The method of claim 1, wherein the machine learning algorithm includes a neural network, support vector network (svn), Hidden Markov Model (HMM), or deep belief network (DBN).

17. The method of claim 1, wherein estimating the boundaries in speech contained in the audio signal from the combined boundary posteriors includes classifying boundaries with a machine learning algorithm.

18. The method of claim 17, wherein the machine learning algorithm used in classifying the boundaries includes a neural network, nearest neighbor classifier, or decision tree.

19. An apparatus for boundary detection in speech recognition, comprising:
   a processor;
   a memory; and
   computer coded instructions embodied in the memory and executable by the processor, wherein the computer coded instructions are configured to implement a method, the method comprising:
      generating combined boundary posteriors from a combination of auditory attention features and the phone posteriors by feeding the phone posteriors of neighboring frames of an audio signal into a machine learning algorithm to classify phone posterior context information;
      estimating one or more boundaries in speech contained in the audio signal from the combined boundary posteriors;
      performing speech recognition on the audio signal using the estimated boundaries.

20. The apparatus of 19, further comprising a microphone coupled to the processor, the method further comprising detecting the audio signal with the microphone.

21. A non-transitory, computer readable medium having program instructions embodied therein, wherein execution of the program instructions by a processor of a computer system causes the processor to perform a method, the method comprising:
   generating combined boundary posteriors from a combination of auditory attention features and the phone posteriors by feeding the phone posteriors of neighboring frames of an audio signal into a machine learning algorithm to classify phone posterior context information;
   estimating one or more boundaries in speech contained in the audio signal from the combined boundary posteriors; and
   performing speech recognition on the audio signal using the estimated boundaries.

* * * * *